United States Patent [19]
Furumura et al.

[11] Patent Number: 5,415,705
[45] Date of Patent: May 16, 1995

[54] ROLLING BEARING

[75] Inventors: Kyozaburo Furumura; Hiroshi Narai; Shuji Wada, all of Kanagawa, Japan

[73] Assignee: NSK Ltd., Tokyo, Japan

[21] Appl. No.: 86,858

[22] Filed: Jul. 7, 1993

[30] Foreign Application Priority Data

Jul. 8, 1992 [JP] Japan .................................. 4-181062

[51] Int. Cl.$^6$ .......................... C21D 9/40; C22C 38/18
[52] U.S. Cl. .................................. 148/319; 148/333; 148/906; 384/492; 384/912
[58] Field of Search ........................ 148/906, 333, 319; 384/492, 912

[56] References Cited

U.S. PATENT DOCUMENTS

| | | | |
|---|---|---|---|
| 4,191,599 | 3/1980 | Stickels et al. | 148/906 |
| 4,904,094 | 2/1990 | Furumura et al. | 384/492 |
| 5,137,375 | 8/1992 | Murakami et al. | 384/450 |

FOREIGN PATENT DOCUMENTS 2155951 10/1985 United Kingdom .

Primary Examiner—Deborah Yee
Attorney, Agent, or Firm—Sughrue, Mion, Zinn, Macpeak & Seas

[57] ABSTRACT

An object of this invention is to provide a rolling bearing which is long enough in serve life even when it is applied with a lubricant mixed with foreign matters, simply by quenching or by carbonitriding it for a short period of time, and which can be formed at a relatively low manufacturing cost. A rolling bearing is formed as follows: The quantities of elements such as C, Si, Mn, Cr and Mo forming a bearing alloy steel, and the quantity of retained austenite are adjusted to be in predetermined ranges, and the steel is quenched and tempered or carbonitrided so that its hardness is in the following range:

$$-2.2 \times (\gamma_R \text{ vol }\%) + 810 \leq Hv \leq -2.2 \times (\gamma_R \text{ vol }\%) + 930$$

9 Claims, 2 Drawing Sheets

ROLLING BEARING

BACKGROUND OF THE INVENTION

This invention relates to bearing steels, automobiles, agricultural machines, construction machines, and iron steel machines, and more particularly to rolling bearings long in service live which are suitable for transmission gears, or engines.

It is well known in the art that, when a lubricant mixed with foreign matters such as metal chips, shavings, burrs and powder (hereinafter referred to as "a foreign-mater-mixed lubricant", when applicable) are applied to a rolling bearing, the bearing ring and rolling elements of the latter are damaged thereby. In order to eliminate this difficulty, the present applicant has proposed a method before by which the service life of a rolling bearing is lengthened even when a foreign-matter-mixed lubricant is applied to it (U.S. Pat. No. 4,904,094): That is, in the method, the content of C, the quantity of retained austenite, and the content of carbon nitride in the surface layer of the rolling bearing are set to suitable values, to lessen the concentration of stress to the edge of an indentation, thereby to prevent the formation of cracks. Furthermore, the applicant has proposed a most favorable relationship between the quantity of retained austenite and the hardness, and an optimum range of average diameters of carbides and carbon nitrides (U.S. Pat. No. 5,137,375), and a range of components most suitable for the relationships and the range (U.S. Ser. No. 07/915,503).

Those methods are based on the addition of carbon or nitrogen to the surface by carburizing or by carbonitriding. Therefore, the methods are disadvantageous in that it takes a relatively long period of time for heat treatment, which increases the processing cost as much, and the content of carbon or nitrogen is fluctuated. On the other hand, when it is tried to obtain an aimed quantity of retained austenite simply by subjecting an ordinary bearing steel to high-temperature quenching, then after heat treatment, the hardness is not sufficiently high, and accordingly it is impossible to lengthen the service life of the rolling bearing applied with a foreign-matter-mixed lubricant foreign matters.

SUMMARY OF THE INVENTION

Accordingly, it is an object of this invention to eliminate the above-described difficulties accompanying a conventional rolling bearing. More specifically, an object of the invention is to provide a rolling bearing which is long enough in serve life even when it is applied with a foreign-matter-mixed lubricant, simply by quenching or by carbonitriding it for a short period of time, and which can be formed at a relatively low manufacturing cost. The foregoing object of the invention has been achieved by the provision of a rolling bearing comprising bearing rings and rolling elements, in which, according to a first aspect of the invention, the bearing rings and/or rolling elements are made of
a material which contains selectively
C 1.1 to 1.6% by weight,
Si 0.05 to 0.8% by weight,
Mn 0.5 to 1.5% by weight,
Cr 1.3 to 3.0% by weight, and
Mo 0.6% or less by weight
when the bearing rings and/or rolling elements are subjected to quenching and tempering, or to quenching and tempering after carbonitriding,
the quantity of austenite retained in the surface layer thereof is
13 to 20% by volume when the bearing rings and/or rolling elements are subjected to quenching and tempering, and
13 to 40% by volume when the bearing rings and/or rolling elements are subjected to quenching and tempering after carbonitriding, and
the hardness (Hv) of the bearing rings or rolling elements subjected to quenching and tempering is in the following range with respect to the quantity of retained austenite:

$$-2.2 \times (\gamma_R \text{ vol }\%) + 810 \leq Hv \leq -2.2 \times (\gamma_R \text{ vol }\%) + 930$$

The foregoing object of the invention has been also achieved by the provision of a rolling bearing comprising bearing rings and rolling elements, in which, according to a second aspect of the invention, at least one of the bearing rings and rolling elements are made of an alloy steel which contains,
C 1.1 to 1.6% by weight,
Si 0.05 to 0.8% by weight,
Mn 0.5 to 1.5% by weight, and
Cr 1.3 to 3.0% by weight;
the quantity of austenite retained in the surface layer thereof is 13 to 40% by volume when the bearing rings and/or rolling elements are subjected to a heating treatment in an eutectoid region of austenite and carbide in a Fe—C equilibrium diagram, and then also are subjected to a tempering treatment; and
the hardness (Hv) of the bearing rings and/or rolling elements after being subjected to the heat treatment and the tempering treatment is in the following range with respect to the quantity of retained austenite ($\gamma_R$):

$$-2.2 \times (\gamma_R \text{ vol }\%) + 810 \leq Hv \leq -2.2 \times (\gamma_R \text{ vol }\%) + 930$$

In the rolling bearing according to the second aspect, the heat treatment may be a quenching treatment in which the quantity of austenite retained in the surface layer thereof is 13 to 20% by volume.

In the rolling bearing according to the second aspect of the present invention, the heat treatment is a carbonitriding treatment and a quenching treatment in which Si contents are 0.05 to 0.45% by weight.

In the rolling bearing according to the second aspect of the present invention, the alloy steel may further contains Mo 0.6% or less by weight.

The present inventors have conducted intensive research on a rolling bearing, particularly on relationships between the rolling contact fatigue life, the quantity of retained austenite, the bearing surface hardness, the heat treatment and the alloy component elements thereof, and found the fact that, when the quantity of retained austenite and the hardness are adjusted to be in suitable ranges by suitably adjusting the alloy composition, the rolling contact fatigue life of the rolling bearing even when the latter is applied with a foreign-matter-mixed lubricant is lengthened. That is, the present inventors have found the following fact, and accomplished the present invention: That is, in the case of an ordinary bearing steel, it is impossible to make the quantity of retained austenite and the hardness suitably compatible with each other even if the quenching temperature is changed; however, when the range of components of the ordinary bearing steel is slightly shifted towards that of components of a high alloy so that, after quenching, a large quantity of retained austenite and a large quantity of retained carbide be compatible with each other, then the quantity of retained austenite and the hardness can be adjusted to values in suitable ranges.

The ranges in composition of components of the alloy and the numerical ranges of other items are defined for the following reasons:

C—In order to make the quantity of retained austenite and the quantity of retained carbide compatible with each other, it is necessary that, after quenching, the retained carbide remains much; that is, it is necessary to increase the quantity of carbon. It has been found that the carbide area rates of rolling bearing alloy steels which is effective in lengthening the service life of the bearing applied with a foreign-matter-mixed lubricant is at least carbide Area Rates 8% as indicated in FIG. 1. And in this case the quantity of carbon is at least 1.1% by weight, and more preferably at least 1.2% by weight. In addition, from the viewpoint of cleanliness, the carbon should be as high in density as practical. However, if the carbon density is excessively high, then bulky carbides are produced to shorten the rolling contact fatigue life of the rolling bearing. Therefore, the maximum value of the quantity of carbon is set to 1.6% by weight.

Si—This element acts as deoxidizing agent in the manufacture of steel, and improves the hardenability, thus being effective in lengthening the service life of a bearing made of the steel. However, if the content of Si is excessively large, then the machinability, forgeability and corrosion resistance are greatly lowered, and the activity coefficient of carbon is increased; that is, the decarbonization is energized. Therefore, the upper limit of the quantity of Si is set to 0.8% by weight. In addition, it has been found that, in the case of adding the element by carbonitriding or the like, the penetration depth relates to the quantity of alloy in such a manner that it is abruptly increased when the content of Si exceeds 0.45% by weight. Therefore, in a carbonitriding process performed to reduce the heat treatment cost, the upper limit of the quantity of Si should be set to 0.45% by weight.

Mn—The quantity of Mn should be at least 0.5% by weight, because Mn acts to improve the hardenability to strengthen the base martensite, and is effective in increasing the retained austenite. However, if the quantity of Mn is excessively large, it adversely affects the machinability. Therefore, the upper limit of the quantity of Mn is set to 1.5% by weight.

Cr—This is a carbon forming element, and is effective in refining carbides in a steel. Therefore, the quantity of Cr should be at least 1.3% by weight. However, if it exceeds 3% by weight, then bulky carbons are produced; that is, it becomes impossible to obtain uniformly refined carbides in the steel. Therefore, the upper limit of the quantity of Cr is set to 3% by weight. However, if the quantity of Cr exceeds 2% by weight, it is difficult to melt carbides during quenching. Therefore, in this case, at a quenching temperature applicable to an ordinary quenching oven, it is difficulty to obtain the aimed quantity of austenite retained high in density, thus adversely affecting the productivity. Hence, the upper limit of the quantity of Cr is preferably set to 2% by weight.

Mo—This element is effective in improving the hardenability, and may be effective in refining carbides. Therefore, addition of Mo is acceptable. However, when the quantity of Mo is 0.6% by weight or larger, its effect is not so high. Hence, the upper limit of the quantity of Mo is set to 0.6%.

Quantity of retained austenite—In the case of alloys concerning the invention, the rolling contact fatigue life of the rolling bearing applied with a foreign-matter-mixed lubricant is increased when the quantity of retained austenite is over 13% more prefexable over 17 vol % by volume, as shown in FIG. 2. This effect is admitted with the quantity of retained austenite up to about 40% by volume; however, if the quantity of retained austenite is set so high, then in the case where an ordinary quenching process is employed, the product is greatly adversely affected in dimensional stability. Therefore, the upper limit of the quantity of retained austenite should be set to 20% by volume. On the other hand, in the case where the service life of the rolling surface is increased by carbonitriding, the quantity of austenite retained in the core can be made relatively small by high-temperature tempering, and the restriction on dimensional stability can be relaxed. Thus, in this case, with then effect in increasing the service life taken into consideration, the upper limit of the quantity of retained austenite is set to 40% by volume and preferably is set to 30% by volume.

Range of the surface hardness with respect to the quantity of retained austenite—is as follows:

$$-2.2 \times (\gamma_R \text{ vol } \%) + 810 \leq Hv \leq -2.2 \times (\gamma_R \text{ vol } \%) + 930$$

When, in the above-described expression, the hardness is smaller than the lower limit, the fatigue strength is decreased, and not only when a foreign-matter-mixed lubricant is applied to the rolling bearing but also when a clean lubricant is applied to it, its service life is shortened. On the other hand, it is impossible to increase the hardness over the upper limit.

BRIEF DESCRIPTION OF THE DRAWING(S)

DETAILED DESCRIPTION OF THE PREFERRED EMBODIMENTS

Concrete examples of this invention will be described.

Figure 3:
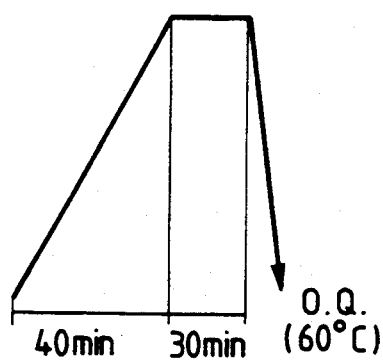
FIG. 3 is a heat pattern revealed when a rolling bearing alloy steel is subjected to ordinary quenching and to high-temperature quenching.
Figure 5:
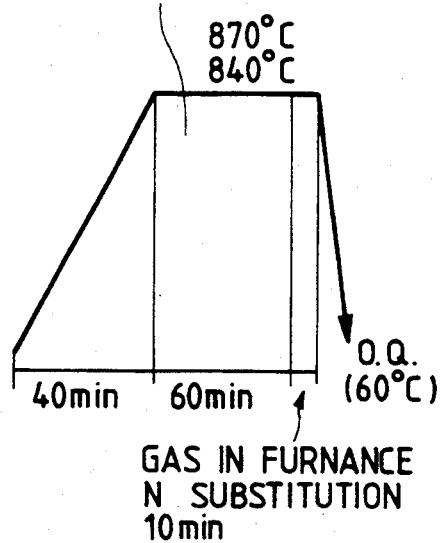
FIG. 5 is a heat pattern revealed when a rolling bearing alloy steel is subjected to carbonitriding.

Specimens were made of steels whose components were as indicated in the following Table 1 and Table 2, and subjected to heat treatment as follows:

For some of the specimens, high-temperature quenching was carried out at a quenching temperature of 880° C. (held for one (1) hour) and at a tempering temperature of 160° C. (held for two (2) hours) as shown in FIG. 3; and for some of the specimens, normal quenching was carried out at a quenching temperature 840° C. (held one (1) hour) and at the same tempering temperature of 160° C. (held two (2) hours).

Figure 4:
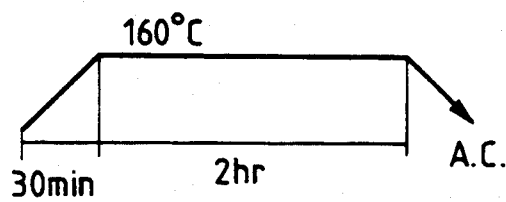
FIG. 4 is a heat pattern revealed when the steel of FIG. 3 is tempered during heat treatment.
Figure 6:
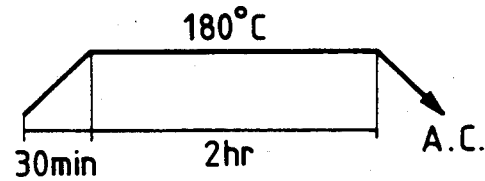
FIG. 6 is a heat pattern revealed when the steel of FIG. 5 is subjected to ordinary tempering during heat treatment.
Figure 7:
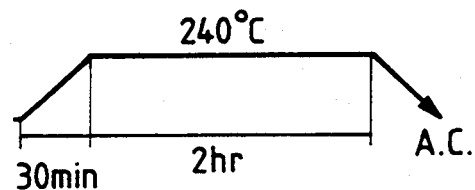
FIG. 7 is a heat pattern revealed when the steel of FIG. 5 is subjected to high-temperature tempering during heat treatment.

The specimens were subjected to carbonitriding in an atmosphere of (Rx gas+enriched gas+ammonia gas) at 870° C. and 840° C. for one (1) hour, and tempered at 180° C. for two (2) hours, as shown in FIG. 4. A tempering process at high temperature was also carried out, and experiments were performed for dimensional stability.

A life test was given to disk-shaped specimens by using a tester disclosed by the publication "Special Steel Handbook (first publication)" compiled by the Denki Seiko Sho, published by Rikougaku-sha, May 25, 1965, pp 19 to 21. The testing conditions were as follows:

Pmax=4900 Mpa

N=3000 c.p.m.

Lubricant VG68 turbine oil

In fabrication of the specimens, the machining allowance of all the specimens subjected to heat treatment was 0.15 mm on one side.

Steel powder (hardness Hv=870, and diameter=74 to 147 μm) was mixed, as foreign matters, in the lubricant to 300 ppm.

The service life was decided as follows: When 10% of a specimen was cracked or flaked to the extent that it could be detected visually or detected under a microscope, it was decided that the specimen's life came to the end; and it was represented by $L_{10}$. More specifically, the specimen's life $L_{10}$ was quantitatively expressed by the sum of the numbers of cycles which were provided until the end of the specimen's life.

Results of those tests are as indicated in Table 1 and Table 2.

TABLE 1

| Items | Specimen No. | Essential chemical components (wt %) | | | | | Heat treatement | Quantity of retained austenite (%) | Surface hardness (Hv) | Carbide area rate (%) | Life $L_{10}$ ($\times 10^6$ cycles) |
|---|---|---|---|---|---|---|---|---|---|---|---|
| | | C | Si | Mn | Cr | Mo | | | | | |
| Concrete examples | 1 | 1.21 | 0.29 | 0.59 | 1.86 | 0.02 | High-temperature quenching | 14 | 784 | 8.4 | 10.1 |
| | 2 | 1.19 | 0.75 | 1.45 | 2.45 | 0.01 | High-temperature quenching | 15 | 836 | 11.2 | 11.9 |
| | 3 | 1.43 | 0.45 | 1.03 | 1.97 | 0.01 | High-temperature quenching | 16 | 811 | 12.5 | 12.1 |
| | 4 | 1.52 | 0.33 | 0.57 | 1.46 | 0.01 | High-temperature quenching | 18 | 775 | 12.8 | 12.0 |
| | 5 | 1.56 | 0.79 | 1.49 | 2.46 | 0.02 | High-temperature quenching | 18 | 832 | 16.2 | 14.3 |
| | 6 | 1.28 | 0.06 | 0.58 | 1.47 | 0.01 | Carbonitriding | 30 | 769 | 12.7 | 25.6 |
| | 7 | 1.22 | 0.07 | 1.47 | 1.87 | 0.02 | Carbonitriding | 31 | 814 | 15.7 | 23.8 |
| | 8 | 1.39 | 0.04 | 0.98 | 1.92 | 0.02 | Carbonitriding | 35 | 779 | 16.6 | 27.1 |
| | 9 | 1.55 | 0.08 | 0.63 | 1.43 | 0.02 | Carbonitriding | 38 | 761 | 17.1 | 26.3 |
| | 10 | 1.53 | 0.05 | 1.50 | 1.98 | 0.01 | Carbonitriding | 39 | 794 | 20.1 | 24.3 |
| | 11 | 1.22 | 0.05 | 0.59 | 1.47 | 0.39 | Carbonitriding | 31 | 791 | 13.0 | 32.1 |
| | 12 | 1.18 | 0.09 | 1.55 | 1.93 | 0.45 | Carbonitriding | 30 | 838 | 16.0 | 33.9 |
| | 13 | 1.43 | 0.07 | 1.02 | 1.98 | 0.43 | Carbonitriding | 35 | 812 | 16.9 | 34.2 |
| | 14 | 1.52 | 0.04 | 0.72 | 1.43 | 0.36 | Carbonitriding | 39 | 771 | 17.4 | 33.1 |
| | 15 | 1.57 | 0.08 | 1.43 | 2.42 | 0.41 | Carbonitriding | 38 | 818 | 20.3 | 20.7 |
| | 16 | 1.19 | 0.31 | 0.53 | 1.43 | 0.41 | High-temperature quenching | 15 | 815 | 8.7 | 15.0 |
| | 17 | 1.21 | 0.78 | 1.47 | 2.51 | 0.39 | High-temperature quenching | 14 | 873 | 11.9 | 15.5 |
| | 18 | 1.36 | 0.53 | 1.05 | 1.99 | 0.40 | High-temperature quenching | 16 | 842 | 12.8 | 16.2 |
| | 19 | 1.57 | 0.29 | 0.58 | 1.41 | 0.42 | High-temperature quenching | 18 | 808 | 12.8 | 16.5 |
| | 20 | 1.54 | 0.78 | 1.47 | 2.51 | 0.37 | High-temperature quenching | 19 | 859 | 16.1 | 17.9 |

TABLE 2

| Items | Specimen No. | Essential chemical components (wt %) | | | | | Heat treatment | Quantity of retained austenite (%) | Surface hardness (Hv) | Carbide area rate (%) | Life $L_{10}$ ($\times 10^6$ cycles) |
|---|---|---|---|---|---|---|---|---|---|---|---|
| | | C | Si | Mn | Cr | Mo | | | | | |
| Comparative examples | 21 | 0.98 | 0.27 | 0.35 | 1.46 | 0.01 | Normal quenching | 8 | 773 | 7.1 | 2.5 |
| | 22 | 0.99 | 0.23 | 0.37 | 1.45 | 0.02 | High-temperature quenching | 13 | 742 | 4.8 | 3.8 |
| | 23 | 1.02 | 0.31 | 0.61 | 2.01 | 0.01 | High-temperature quenching | 15 | 765 | 5.7 | 4.0 |

TABLE 2-continued

| Items | Specimen No. | Essential chemical components (wt %) | | | | | Heat treatment | Quantity of retained austenite (%) | Surface hardness (Hv) | Carbide area rate (%) | Life $L_{10}$ ($\times 10^6$ cycles) |
|---|---|---|---|---|---|---|---|---|---|---|---|
| | | C | Si | Mn | Cr | Mo | | | | | |
| | 24 | 1.19 | 0.34 | 0.32 | 2.20 | 0.02 | High-temperature quenching | 9 | 808 | 9.2 | 4.3 |
| | 25 | 0.97 | 0.60 | 0.98 | 1.04 | 0.02 | High-temperature quenching | 19 | 720 | 4.8 | 4.5 |
| | 26 | 1.42 | 0.49 | 0.97 | 2.03 | 0.01 | Normal quenching | 10 | 791 | 14.7 | 3.8 |
| | 27 | 1.02 | 0.27 | 0.35 | 1.46 | 0.01 | Carbonitriding | 12 | 742 | 8.8 | 3.3 |
| | 28 | 1.42 | 0.46 | 1.03 | 2.08 | 0.44 | Normal | 5 | 852 | 16.0 | 4.3 |
| | 29 | 0.90 | 0.02 | 0.32 | 1.01 | 0.01 | Carbonitriding | 28 | 721 | 4.1 | 8.2 |
| Concrete examples | 30 | 1.43 | 0.45 | 1.03 | 1.97 | 0.01 | Carbonitriding | 22 | 812 | 15.2 | 20.1 |
| | 31 | 1.21 | 0.29 | 0.59 | 1.86 | 0.02 | Carbonitriding | 20 | 779 | 14.0 | 21.0 |
| | 32 | 1.52 | 0.33 | 0.57 | 1.46 | 0.01 | Carbonitriding | 22 | 775 | 14.1 | 20.0 |
| | 33 | 1.19 | 0.31 | 0.53 | 1.43 | 0.36 | Carbonitriding | 20 | 808 | 11.5 | 22.2 |
| | 34 | 1.57 | 0.29 | 0.58 | 1.41 | 0.42 | Carbonitriding | 21 | 815 | 13.0 | 21.5 |
| | 35 | 1.53 | 0.05 | 1.50 | 1.98 | 0.01 | Carbonitriding High-temperature quenching | 14 | 784 | 22.0 | 12.1 |
| Comparative examples | 36 | 1.81 | 0.46 | 0.98 | 1.97 | 0.02 | High-temperature quenching | 27 | 857 | 16.6 | 5.9 |
| | 37 | 1.42 | 1.02 | 1.01 | 2.03 | 0.01 | High-temperature quenching | 21 | 814 | 11.9 | 17.4 |
| | 38 | 1.36 | 0.43 | 1.81 | 1.95 | 0.02 | High-temperature quenching | 23 | 807 | 11.5 | 17.0 |
| | 39 | 1.43 | 0.45 | 1.05 | 3.49 | 0.01 | High-temperature quenching | 16 | 821 | 15.1 | 3.4 |
| | 40 | 1.41 | 0.51 | 0.96 | 2.02 | 0.83 | High-temperature quenching | 17 | 853 | 12.9 | 16.7 |
| | 41 | 1.52 | 0.02 | 0.72 | 1.50 | 0.02 | Carbonitriding High-temperature quenching | 46 | 690 | 16.3 | 6.5 |
| | 42 | 1.44 | 0.45 | 1.03 | 1.99 | 0.01 | Ultra-high-temperature quenching | 25 | 798 | 11.1 | 19.1 |

In Table 1 and Table 2, specimens 1 through 20 and specimens 30 through 35 are concrete examples of the invention. In those concrete examples, steels whose components were in the ranges specified in claim 1 were employed, and subjected to high-temperature quenching to obtain the aimed quantity of retained austenite. A life test was given to those concrete examples lubricated with a foreign matter mixed lubricant. The service lives of the concrete examples were long enough to withstand $10 \times 10^6$ cycles of stress.

For comparison, steels whose components were of specimens 21 through 26 were quenched at two temperatures of 840° and 880°, and a life test was given to the steels under the same conditions. Results of the life test were as follows: That is, in the case of specimens 21 and 26 quenched normally, the quantity of retained austenite was not increased. Therefore, the specimens 21 and 26 were shorter in service life than the steels of the invention. Specimen 21 is a bearing steel II which is popularly employed, having a life characteristic which is typical of standard bearings used presently.

Specimens 22, 23 and 25 were quenched at high temperature. Specimens 22, 23 and 25 were larger than the above-described specimens in the quantity of retained austenite. However, as the quantity of retained austenite increased, the hardness was decreased. Therefore, in those specimens, a rolling contact fatigue life with a foreign-matter-mixed lubricant was not increased. Specimen 25 was a bearing steel III used presently, with which a relatively large quantity of retained austenite can be obtained relatively readily. However, increasing the quantity of retained austenite results in a decrease in hardness. Therefore, with specimen 25, the service life is not increased.

In the case of specimen 24, the quantities of carbon and Cr were increased to increase the quantity of residual carbide. However, at a temperature of 880° C., which was the upper limit of actual quenching temperature, the quantity of retained austenite was not increased, and accordingly the bearing's service life was not increased. Using a higher quenching temperature higher would adversely affect the durability of the quenching oven, and greatly deform the bearing, and accordingly increase the machining cost. That is, to use a quenching temperature higher than 880° C. was not suitable for the invention in manufacturing cost.

In the case of specimen 26, one of the comparative examples, the quantities of carbon and Cr were increased, and the quenching temperature was set to an ordinary temperature, 840° C. However, being not molten the carbide scarcely penetrated the base of carbon, and the quantity of retained austenite was small, and therefore the service life was not increased.

Specimens 16 through 20 were steels which were obtained by adding Mo to the fundamental chemical components of steel of the invention. Therefore, specimens 16 through 20 were high both in retained austenite quantity and in hardness. Thus, in a rolling contact fatigue life test given to specimens applied with a foreign-matter-mixed lubricant, those specimens 16 through 20 showed a longer service life than specimens 1 through 5 which employed steels containing no Mo.

Specimen 28, one of the comparative examples, employed a steel corresponding to the steel claimed in claim 1 of the invention. However, it was subjected to normal quenching instead of high-temperature quenching. In specimen 28, too, the quantity of retained austenite was small, and therefore the service life was short, approximately one-third of that of specimens 16 through 20 using the steel of the invention.

Now, concrete examples of the rolling bearing according to the invention will be described, which, being slightly higher in manufacturing cost, can be formed at a manufacturing cost closed to that which is involved in the case where simple quenching is carried out as in the case of the above-described steel of the invention, and is longer in service life.

In general, steel should be carbonitrided for at least five (5) hours. If a practical carburization effect is obtained with the carbonitriding time set to one hour or less, then a productive efficiency can be obtained which are substantially equal to that which is obtained in the case where an ordinary continuous quenching oven is used to subject steel to simple quenching.

Specimens 30 through 34 were based on the above-described fact. That is, those specimens were formed by using steels whose components are as indicated in Tables 1 and 2 (sic). The steels were subjected to carbonitriding and quenching as shown in FIG. 4. The carbonitriding temperature was 780° C., and the holding time was one hour. After this heat treatment, the bearings were machined as much as a machining allowance of 0.15 mm (in the case of small bearings or rolling elements, the machining allowance of the specimens subjected to heat treatment was 0.15 mm on one side). The specimens thus formed were tested.

Figure 1:
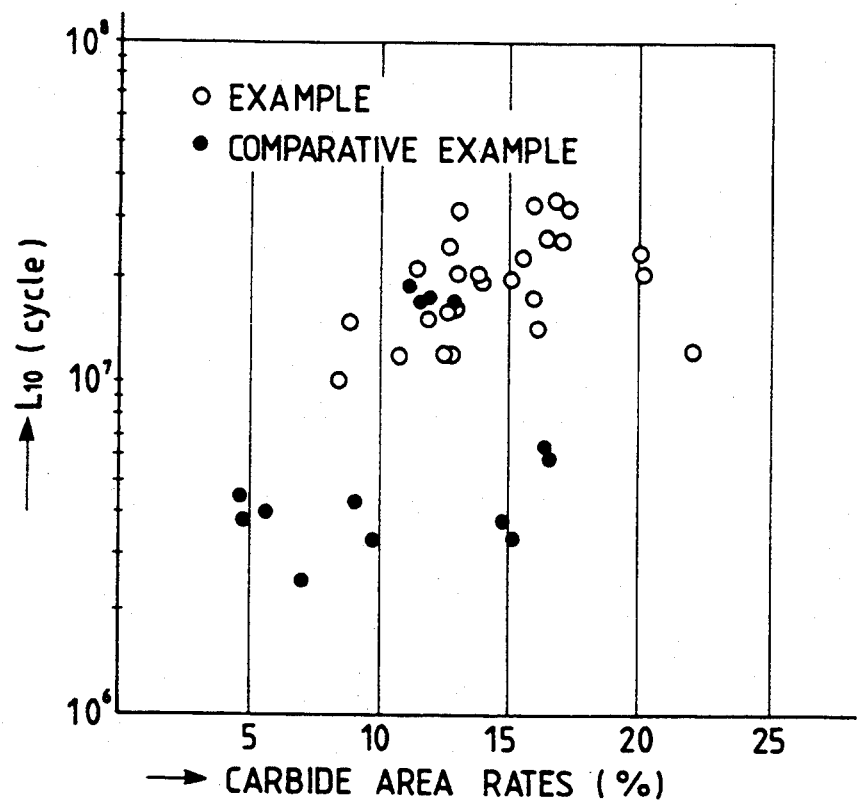
FIG. 1 is a graphical representation indicating the carbide (or carbon nitride) area rates of rolling bearing alloy steels with the service lives of rolling bearings made of the latter.
Figure 2:
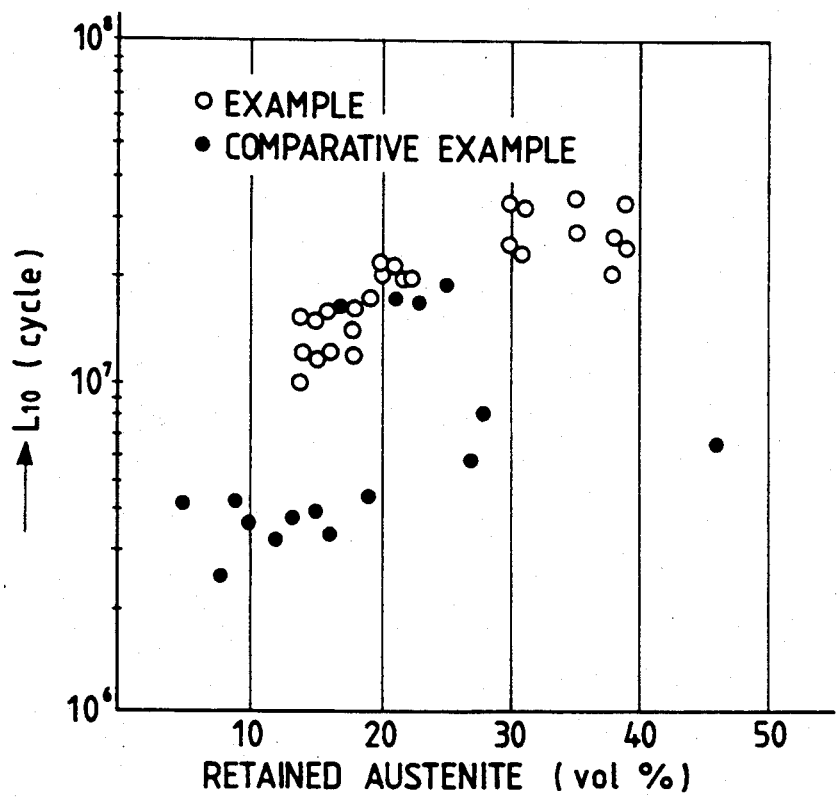
FIG. 2 is a graphical representation indicating the quantities of retained austenite of rolling baring alloy steels with the service lives of rolling bearing made of the latter.

Because of the short time treatment, the sum of the quantities of carbon and nitrogen in the finished surface were small, C+N=0.2%. However, the quantity of retained austenite was increased to about 6% in the surface; that is, it was 20% or larger. Hence, the rolling contact fatigue life was 70% longer than those of the specimens processed by simple quenching, as seen from FIGS. 1 and 2 and Table 1.

On the other hand, in specimen 27, one of the comparative example, the steel was equal in composition to a bearing steel used presently, and it was subjected to carbonitriding for one hour under the same conditions as those in the fabrication of specimens 30 through 34. The specimen thus formed was insufficient both in retained austenite quantity and in hardness.

Specimens 6 through 15 are concrete examples of the invention.

In those specimens, the steel was decreased in the quantity of Si to 0.2% or less. The steel was carbonitrided at 840° C. for one hour in an atmosphere of (Rx gas+enriched gas+ammonia gas 5%. This carbonitriding treatment was effective. This is because, since Si acts to effectively suppress the diffusion of carbon and nitrogen, the quantity of Si is decreased maximumly, to allow the diffusion of carbon and nitrogen in a short time. As is apparent from the data of specimens 6 through 15, in the surface layer the quantity of retained austenite was greatly increased, more than 30%, and the hardness was relatively high. Thus, the rolling contact fatigue life was lengthened most.

On the other hand, in specimen 29, one of the comparative examples, the quantity of Si was smaller than 0.2%, and therefore the carbonitriding speed was high. However, in the specimen, the composition of chemical components thereof was of the range specified by the invention, and the quantity of residual carbide was less, and the hardness was low.

In the carbonitriding of an extremely low Si steel, the surface is high in retained austenite quantity, and the surface hardness can be made high, and the quantity of retained austenite in the core is lower than in the case where an ordinary bearing steel is carbonitrided; that is, it can be suppressed to about 10%.

Therefore, in specimen 35, the tempering temperature was set to a high value; that is, under the high-temperature tempering conditions shown in FIG. 4 the quantity of retained austenite in the core was reduced to 3% or less, so that the dimensional stability was increased, thus permitting the use of the bearing at 200° C.; while in the surface layer a retained austenite quantity of 14% was maintained. As a result, it was confirmed that the rolling contact fatigue life was longer than $10 \times 10^6$ cycles. Thus, the specimen can be go with a high-temperature tempering specification for a bearing used at high temperature.

In specimens 36 through 40, comparative examples, parts of the components of the alloy steel were excessively large, exceeding the upper limits of the quantities of components according to the invention. Results of the test given to them are as indicated in Table 2.

In specimen 36, the quantity of C was excessive. In specimen 39, the quantity of Cr was excessive. In each of specimens 36 and 39, the carbide was rough and bulky, which decreased the rolling contact fatigue life.

In specimen 37, the quantity of Si was excessive. In specimen 38, the quantity of Mn was excessive. Both specimen 37 and specimen 38 were sufficiently long in service life; however, the use of them were not practical because when the specimen was machined with a cutting tool, the latter was worn more than twice as much as in the ordinary machining operation.

Specimen 40 was excessive in the quantity of Mo; however, it was satisfactory in quality. On the other hand, as is apparent from comparison with specimen 18, even if Mo is excessively added, it cannot be expected to have additional effects. That is, Mo is an expensive element, and addition of Mo more than 5% by weight is not practical.

In contrast to the above-described specimens, in specimen 41, the quantity of Si was less than the respective one of the lower limits of the quantities of components according to the invention. In this feature, specimen 41 was equal to above-described specimen 29. In the case of specimen 41, the product, after carbonitrided, was subjected to high-temperature quenching (secondary quenching), so that the quantity of retained austenite was larger than defined by the invention. However, the resultant rolling bearing was low in surface hardness, and accordingly short in service life.

In Specimen 42, the alloy composition was in the range specified by the invention. In the case of specimen 42, the quenching temperature was set to an extremely high value, 920° C., so that the quantity of retained austenite was slightly increased. Specimen 42 was satisfactory in service life; however, it was low in dimensional stability (its maximum expansion being 0.2%). Thus, the use of specimen 42 was not practical.

In the rolling bearing of the invention, as was described above, the quantities of components of the alloy steel forming it are adjusted in combination, and the quantity of retained austenite and the hardness of the rolling bearing are controlled suitably by subjecting it to simple quenching for a short time or to carbonitriding for a short time. Hence, the rolling contact fatigue life of the rolling bearing applied with a foreign-matter-mixed lubricant is lengthened, and the rolling bearing can be provided at low manufacturing cost.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A rolling bearing comprising bearing rings and rolling elements which roll between said rings, wherein:
   at least one of said bearing rings and rolling elements are made of an alloy steel which contains,
   C 1.1 to 1.6% by weight,
   Si 0.05 to 0.8% by weight,
   Mn 0.5 to 1.5% by weight, and
   Cr 1.3 to 3.0% by weight;
   the quantity of austenite retained in the surface layer of at least one of said bearing rings and rolling elements being 13 to 40% by volume in said bearing rings and/or rolling elements which have been subjected to a heating treatment in a coexistence region of austenite and carbide in a Fe—C equilibrium diagram, and then also are subjected to a tempering treatment;
   a carbide area ratio of retained carbide retained in the surface layer of said bearing rings and/or rolling elements after being subjected to said heating treatment and said tempering treatment being in the range of 8–22%; and
   the hardness (Hv) of said bearing rings and/or rolling elements after being subjected to said heat treatment and said tempering treatment being in the following range with respect to said quantity of retained austenite ($\gamma_R$):

$$-2.2 \times (\gamma_R \text{ vol \%}) + 810 \leq Hv \leq -2.2 \times (\gamma_R \text{ vol \%}) + 930.$$

2. A rolling bearing according to claim 1, wherein said heat treatment is a quenching treatment in which said quantity of austenite retained in the surface layer thereof is 13 to 20% by volume.

3. A rolling bearing according to claim 1, wherein said heat treatment is a carbonitriding treatment and a quenching treatment in which Si contents are 0.05 to 0.45% by weight.

4. A rolling bearing according to claim 1, wherein said alloy steel further contains Mo 0.6% or less by weight.

5. A rolling bearing according to claim 2, wherein said alloy steel further contains Mo 0.6% or less by weight.

6. A rolling bearing according to claim 3, wherein said alloy steel further contains Mo 0.6% or less by weight.

7. A rolling bearing according to claim 3, wherein said quantity of austenite retained in the surface layer thereof is 17 to 30% by volume.

8. A rolling bearing according to claim 3, wherein said alloy steel further contains Mo 0.6% or less by weight and said quantity of austenite retained in the surface layer thereof is 17 to 30% by volume.

9. A rolling bearing according to claim 3, in which said carbonitriding treatment is conducted in an atmosphere of Rx gas, enriched gas and 5% ammonia gas.

* * * * *